(12) United States Patent
Henderson

(10) Patent No.: US 7,707,797 B2
(45) Date of Patent: May 4, 2010

(54) PILE ANCHOR FOUNDATION

(76) Inventor: Allan P. Henderson, 2005 Airport Dr., Bakersfield, CA (US) 93308

( * ) Notice: Subject to any disclaimer, the term of this patent is extended or adjusted under 35 U.S.C. 154(b) by 0 days.

(21) Appl. No.: 12/076,904

(22) Filed: Mar. 25, 2008

(65) Prior Publication Data
US 2008/0232906 A1    Sep. 25, 2008

Related U.S. Application Data

(62) Division of application No. 10/734,281, filed on Dec. 15, 2003.

(51) Int. Cl.
E02D 27/12 (2006.01)
E02D 27/42 (2006.01)
E02D 27/32 (2006.01)

(52) U.S. Cl. .................. 52/745.17; 52/111; 52/153; 52/155; 52/158; 52/166; 52/169.9; 52/292; 52/295; 52/745.04; 52/741.17; 52/741.13; 52/741.14; 52/223.4; 52/223.5; 405/232; 405/233; 405/244; 405/252.1

(58) Field of Classification Search ......... 405/228–229, 405/232–233, 236–239, 242–249, 252.1; 52/111, 153, 155, 156–158, 166, 169.9, 292–299, 52/741.15, 745.04, 745.17, 741.13, 741.14, 52/223.4, 223.5, 745.15, 741.11, 742.14

See application file for complete search history.

(56) References Cited

U.S. PATENT DOCUMENTS

| | | | | | |
|---|---|---|---|---|---|
| 1,164,085 | A | * | 12/1915 | Goldborough | 405/244 |
| 3,525,224 | A | * | 8/1970 | Bardgette | 405/225 |
| 4,031,687 | A | * | 6/1977 | Kuntz | 52/741.15 |
| 4,060,994 | A | * | 12/1977 | Chitis | 405/238 |
| 5,586,417 | A | * | 12/1996 | Henderson et al. | 52/295 |
| 6,665,990 | B1 | * | 12/2003 | Cody et al. | 52/295 |
| 7,066,094 | B2 | * | 6/2006 | Moutsokapas et al. | 104/124 |

* cited by examiner

Primary Examiner—Jeanette Chapman
(74) Attorney, Agent, or Firm—Jacobson Holman PLLC (57) ABSTRACT

A circular concrete cap foundation poured in-situ within a perimeter forming corrugated metal pipe set atop or within an excavated pit and enclosing a series of circumferentially spaced pile anchors. The circular concrete cap foundation supports sets of inner and outer circumferentially spaced tower anchor bolts having their lower ends anchored to an embedded anchor ring and their upper ends projecting vertically and upwardly out the top of the circular foundation to engage the base flange of a supported tower. The pile anchors are formed with perimeter corrugated metal pipes set deep in subsurface soils with cementitious material surrounding and partially bonding to a centralized steel bolt or tendon which extends through the cap foundation. The tower anchor bolts and the pile anchor bolts are both partially encased in a PVC sleeve so that the bolts can be post-tensioned. The pile anchors are in tension only and serve to pull the cap foundation down to compress the underlying ground soils.

16 Claims, 5 Drawing Sheets

PILE ANCHOR FOUNDATION

RELATED APPLICATIONS

This application is a divisional of copending application Ser. No. 10/734,281, filed Dec. 15, 2003, and hereby claims the priority thereof to which it is entitled.

BACKGROUND OF THE INVENTION

1. Field of the Invention

This invention relates in general to concrete support foundations constructed in-situ particularly useful for supporting tall, heavy and/or large towers which may be used to support wind turbines, power lines, street lighting and signals, bridge supports, commercial signs, freeway signs, ski lifts and the like. More specifically, the pile anchor foundation of the present invention is useful in supporting such towers in clay or other fine grain soils which are water bearing and/or too weak to stand or maintain the dimensions of an excavation formed to receive a concrete foundation. Such soils can be found in the midwest region of the United States.

2. Description of Related Art

My earlier U.S. Pat. Nos. 5,586,417 and 5,826,387, entitled Tensionless Pier Foundation and Pier Foundation under High Unit Compression, respectively, and my pending U.S. patent application Ser. No. 10/067,999, filed Feb. 8, 2002 and entitled Perimeter Weighted Foundation for Wind Turbines and the like which is a continuation of U.S. patent application Ser. No. 09/671,282, now abandoned, disclose post-tensioned concrete tower foundations, the disclosures of which are incorporated herein by reference as if fully set forth. The prior art cited in these patents and application may also be relevant to the pile anchor foundation of this invention.

SUMMARY OF THE INVENTION

The foundation of this invention resists supported structure overturn by a multitude of circumferentially spaced post tensioned pile anchors. Each of the pile anchors includes a corrugated metal pipe (CMP) driven into subsurface soils. The CMPs are filled with cementitious material securing a centralized bolt or tendon to be post-tensioned from a top surface of a concrete cap positioned above the pile anchors. The pile anchor bolts or tendons are encased, preferably in a plastic sleeve or the like, so that they do not bond to or bear into the upper foundation concrete cap, thus allowing the pile anchor to pull upward until skin friction resistance with the surrounding soils equaling the required tendon tension is achieved. The required bolt or tendon tension exceeds the maximum structure uplift load determined for each pile anchor. The pile anchors of this invention also differ from normal piles in that they are tension piles resisting only overturn uplift, and they do not serve as load bearing compression piles for supporting the structure.

In a conventional pile foundation, the piles extend upwardly through or into an overlying concrete foundation and are both compression and tension resisting foundation extensions. The piles in such foundations are not post-tensioned. The foundation of this invention allows pole and tower structure foundations to be constructed at or below ground surface in weaker water bearing soils susceptible to side wall caving when excavated.

The pile anchor foundation of the instant invention has a circular concrete cap set at or below ground surface which supports a tower from the upper surface thereof. The tower is attached to the concrete cap by a series of circumferentially spaced tower anchor bolts. The tower anchor bolts extend through and are nutted atop a circular tower base flange at the bottom of the tower and below an embedment, ring near the bottom of the concrete cap. The tower anchor bolts are also sleeved and shielded so as to prevent the concrete from bonding to the anchor bolts. This structure allows the tower anchor bolts to be elongated and post-stressed between the tower base flange and the embedment ring to alleviate bolt cycling and fatigue.

The tower base flange is set in grout inside a grout trough molded by a template bottom ring. Leveling nuts are threaded onto several tower anchor bolts spaced around and underneath the tower base flange in a blockout void formed by blackouts of foam plastic or the like. The leveling nuts allow the tower to be plumbed vertically and support the base section of the tower while grout is poured into the grout trough under the tower base flange and cured.

Electrical and communication conduits are positioned in and through the concrete cap to allow wiring and conductors to be pulled into the tower. Also, reinforcement rebars are provided at the top and bottom of the concrete cap as well as lapping vertically near the perimeter thereof which are tied and placed radially between the anchor bolts. The rebar reinforcement is intended to resist bending forces in the concrete cap.

The pile anchor tendons or bolts, preferably in plastic sleeves or the like, and most preferably in PVC tubes, extend through the concrete cap and a pile anchor base plate, and into a major extent of the pile anchor cementitious material. The upper end of the tendon or bolt is equipped with a post-tensioning nut threaded thereon to post-tension the pile anchor and the concrete cap after the cementitious material thereof has hardened.

The pile anchors are constructed to terminate below the foundation concrete cap to form a gap which is preferably filled with a compressible material immediately below the foundation cap. The pile anchors around the perimeter are driven lengths of galvanized CMP filled with cementitious material except for the top of the CMP immediately below the bottom of the concrete cap. The cementitious material encases a centralized anchor bolt or tendon sleeved at the top and bare at its bottom with an end nut to facilitate the bottom of the bolt bonding with the cementitious material.

In accordance with the foregoing, it is an object of the present invention to provide a concrete foundation for supporting tall, heavy and/or large towers and/or poles which can be constructed in situ and is especially useful for supporting such towers in clay or other fine grain soils which are water bearing or otherwise too weak to stand or maintain the dimensions of an excavation formed to receive a concrete foundation.

A further object of the present invention is to provide a concrete foundation which includes a generally circular or cylindrical foundation cap set at or below the ground surface to support a tower from the upper surface thereof and a plurality of circumferentially spaced post tensioned pile anchors which depend a substantial distance into the ground below the base of the foundation cap.

Another object of the present invention is to provide a concrete supporting foundation in accordance with the preceding object in which each pile anchor includes an elongated bolt or tendon extending substantially throughout the length of the pile anchor, through the concrete cap and above the top surface thereof, for post tensioning the pile anchors and pull the concrete foundation cap downwardly to compress the underlying bearing soils.

Still a further object of the present invention is to provide the aforementioned bolts or tendons of the pile anchors with plastic sleeves or the like over a major portion of their upper extent to prevent bonding with the concrete in the upper portion of the pile anchor and the concrete cap, facilitate the post tensioning of the pile anchors and eliminate stress reversals and fatigue while the bolts are stretched by jacking or torquing during the post tensioning.

Yet another object of the present invention is to provide a concrete supporting foundation for large and heavy tower structures including a concrete foundation cap and downwardly extending pile anchors which are tension members only and serve to pull the concrete foundation cap downwardly to compress the underlying soils with such a compression force that the concrete foundation cap is always bearing on the underlying soils even under the greatest overturning and uplift forces transmitted to the foundation by the supported structure.

Other objects and advantages of this invention will become apparent from the following description, taken in connection with the accompanying drawings, wherein is set forth by way of illustration and example, embodiments of this invention.

DESCRIPTION OF THE PREFERRED EMBODIMENT

Although one preferred embodiment of the invention is explained in detail, it is to be understood that the invention is not limited in its scope to the details of construction and arrangement of components of this specific embodiment. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Figure 1:
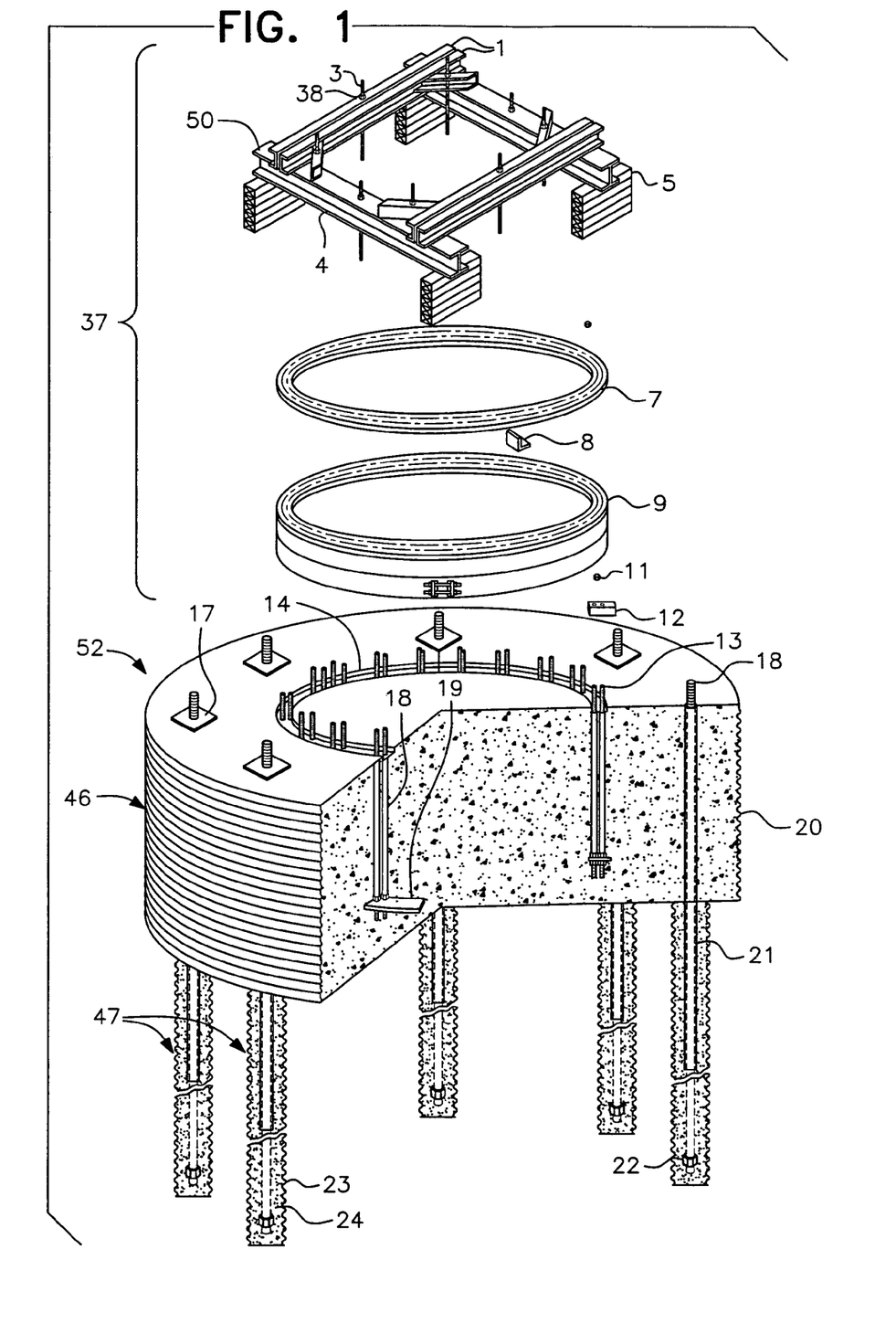
FIG. 1 is an exploded perspective view, partially in section, of the completed cap and pile anchor foundation constructed in accordance with a preferred embodiment of the present invention.
Figure 2:
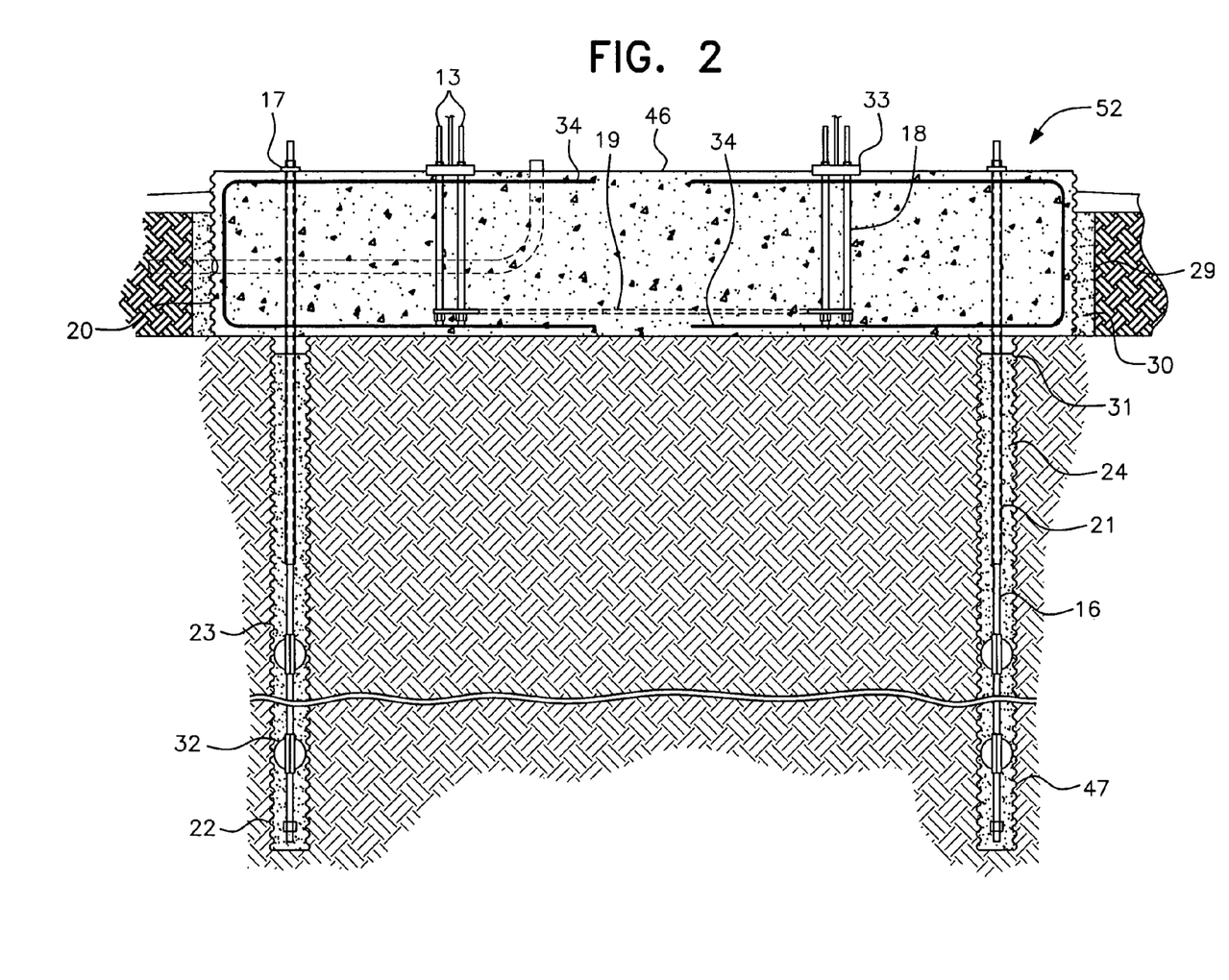
FIG. 2 is a sectional view of the completed foundation with the tower base section flange set in the grout trough, with the concrete cap and pile anchors in accordance with preferred embodiments.

Referring to the drawings, especially FIGS. 1 and 2, the foundation of the present invention is generally designated by reference numeral 52. The foundation 52 of the present invention includes a circular or cylindrical foundation cap generally designated by reference numeral 46 and a series of circumferentially spaced pile anchor assemblies generally designated by reference numeral 47. The foundation cap 46 preferably includes an outer upstanding corrugated metal pipe (CMP) 20 at its perimeter which may, for example, be 24 feet in diameter and 4 feet in height. The outer CMP 20 is placed atop the ground or in an excavation 29 formed in the ground and resting upon the bottom of the excavation 29. (See FIGS. 2 and 4).

Referring to FIG. 2, the void between the outer corrugated metal pipe 20 at the foundation cap perimeter and the edge of the excavation is filled with clean sand or sand cement slurry 30. The foundation cap 46 includes a series of tower anchor bolts 13 spaced circumferentially about the central point of the foundation cap 46 (see FIGS. 2 and 3). The tower anchor bolts 13 may be positioned in radial pairs forming two anchor bolt circles. The inner tower anchor bolt circle has a slightly shorter diameter than the outer tower anchor bolt circle. For example, the outer tower anchor bolt circle diameter may be 14 feet and the inner tower anchor bolt circle diameter may be 13 feet. The anchor bolts 13 are sleeved, preferably with PVC tubes 18, which cover the anchor bolts 13 except for threaded portions at the top and bottom of the bolts (see FIGS. 2 and 5). The anchor bolt sleeves 18 prevent bonding of the bolts 13 to the concrete and grout.

Figure 5:
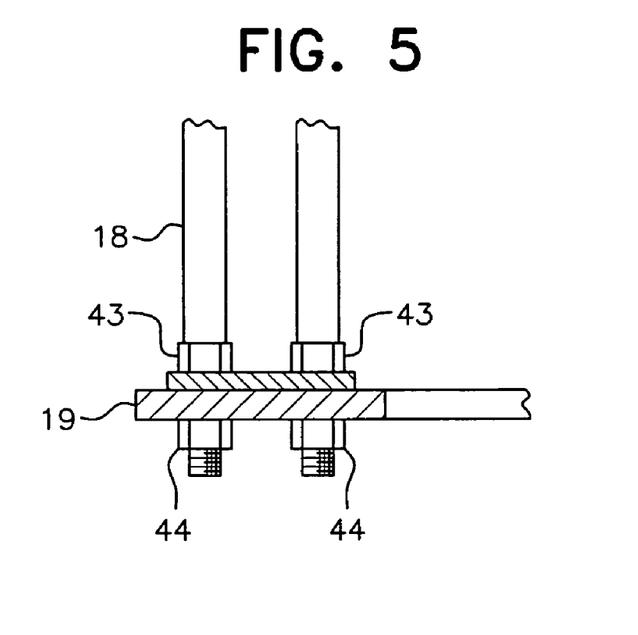
FIG. 5 is an enlarged fragmentary sectional view of the embedment ring at the bottom of the tower anchor bolts illustrating two nuts, PVC sleeve and a splice plate for connecting segments of the embedment ring.

Referring to FIGS. 2 and 5, the lower ends of the tower anchor bolts 13 are anchored near the bottom of the concrete cap foundation 46 with an embedment ring 19 which preferably may be constructed of several circumferential segments lap jointed at 45. The embedment ring 19 is preferably about the same size as and complementary to the tower base flange 33. The ring 19 contains bolt holes for each of the anchor bolts 13. The bolts 13 are secured in the bolt holes by any suitable securement, such as hex nuts 44 below the embedment ring 19 and hex nuts 43 atop the embedment ring as shown in FIG. 5.

Figure 3:
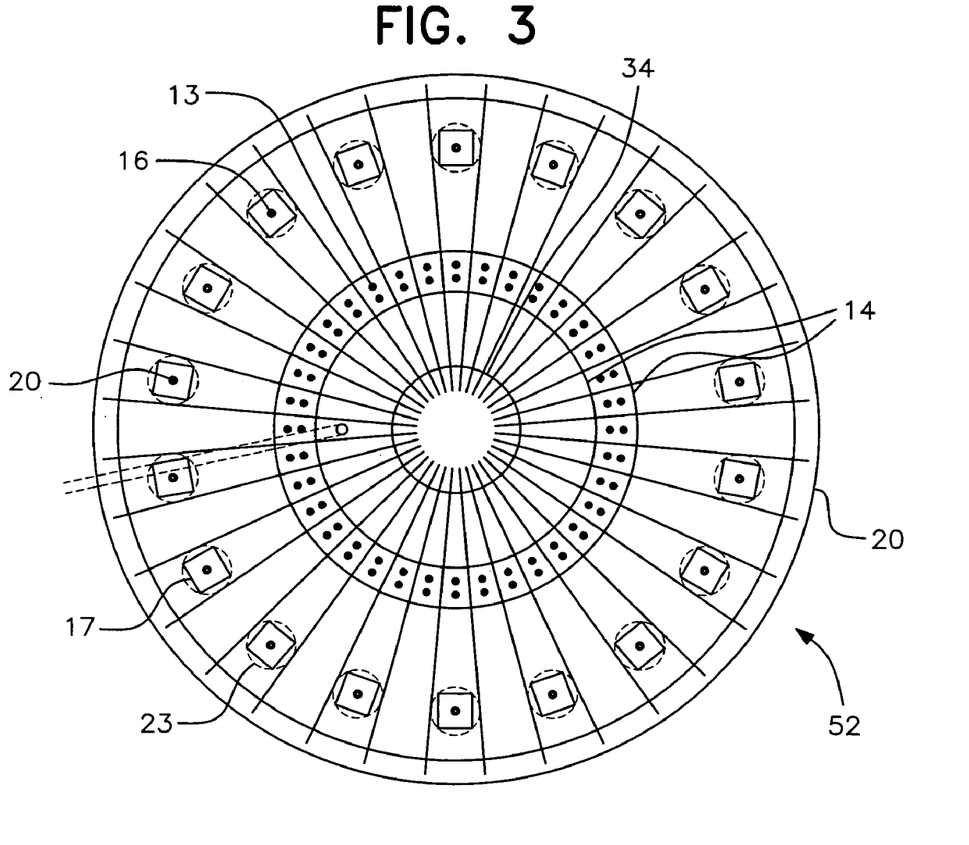
FIG. 3 is a top plan view of the foundation under the template, prior to concrete being poured.
Figure 4:
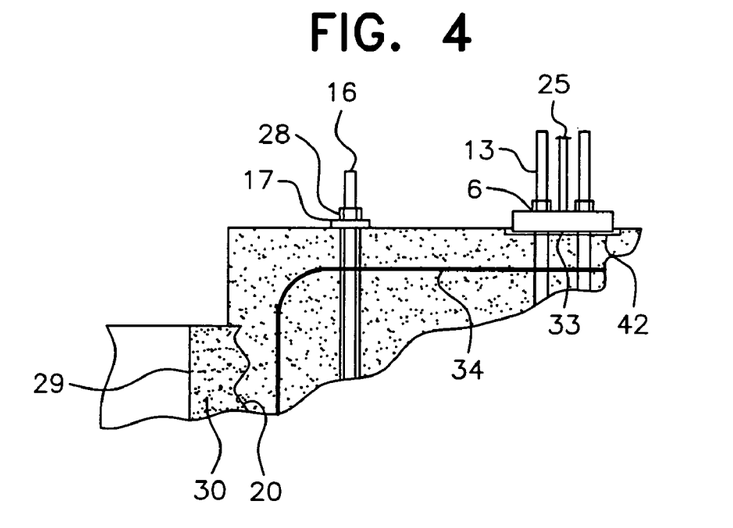
FIG. 4 is an enlarged fragmental view, partly in section, of the completed foundation illustrating the upper pile anchor, the tower anchor bolts and foundation cap with the tower base flange positioned atop the foundation.

Referring to FIGS. 2, 3, and 4, reinforcing steel rebar 34 is positioned radially between the pairs of anchor bolts 13 and the pile anchor bolts 16. The radial steel rebar 34 preferably are placed both near the top and bottom of the concrete cap foundation 46 and are lapped vertically and wire tied near and parallel to the outer CMP 20.

Figure 6:
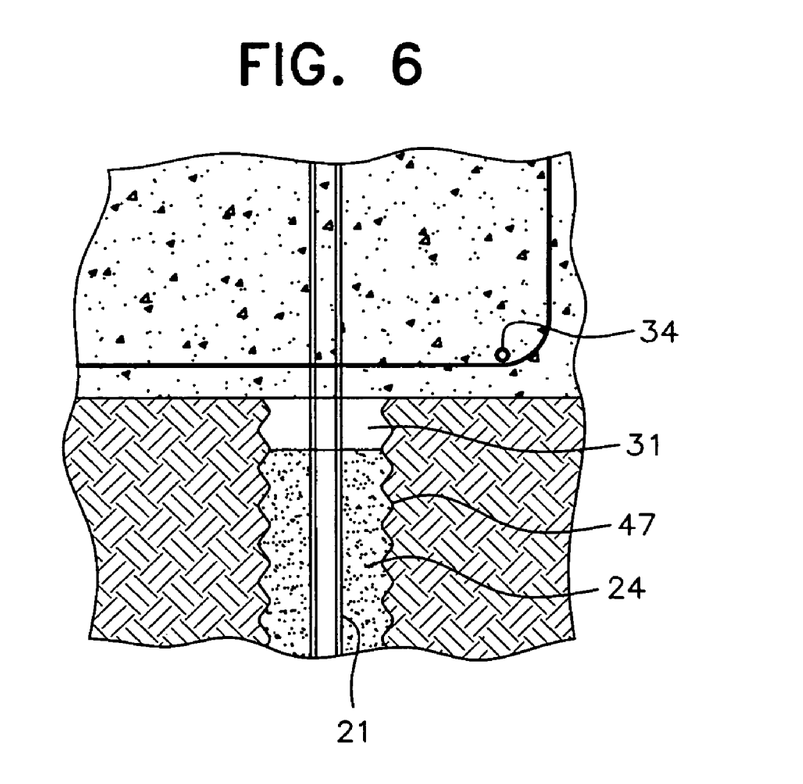
FIG. 6 is an enlarged fragmental view illustrating the top of a post tensioned pile anchor with the compressible material filling the skin friction development gap between the top of the cementitious material of the pile anchor and the bottom of the foundation cap.
Figure 7:
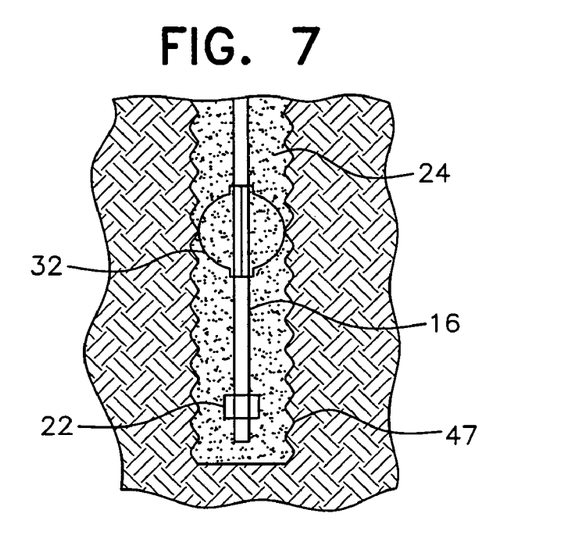
FIG. 7 is an enlarged fragmental view illustrating the bottom of the pile anchor with terminating nut and centralizer.

FIGS. 1 and 2 show complete views of the pile anchor assemblies 47. Each pile anchor assembly 47 consists of a pipe, preferably a corrugated metal pipe (CMP) 23, driven into the ground sands, silts, clays, or combinations thereof by a mandrel pile driver. Post-tensioning pile anchor bolts or tendons, preferably all-thread bolts 16 with a nut 22 at the bottom, are centralized in the center of the pile anchor CMP 23 by pile anchor centralizers 32 (see FIGS. 2 and 7). The pile anchor bolts 16 are sleeved, preferably by PVC tubing along a major upper portion 21 of their length to prevent bonding with the concrete foundation cap 46 and pile anchor grout 24 and to allow for post-tension stretching. The portion of the pile anchor bolts 16 below the PVC no bond zone and the bottom nut 22 are encased and secured in position by cementitious grout or concrete 24 pumped to fill the interior of the pile anchor CMP 23. The grout or concrete 24 fills the interior of the pile anchor CMP 23 to within about two (2) feet of the bottom of the concrete foundation cap 46, leaving an unfilled spaced 31 (see FIG. 6). Following concrete pour and cure of the foundation cap 46, the pile anchor base plates 17 are installed over the pile anchor bolts 16 atop the concrete foundation cap, and the post-tensioning nuts 28 are torqued or threaded snugly against the pile anchor plates 17 during the post-tensioning jacking of the pile anchor bolts 16 (see FIG. 4).

Figure 8:
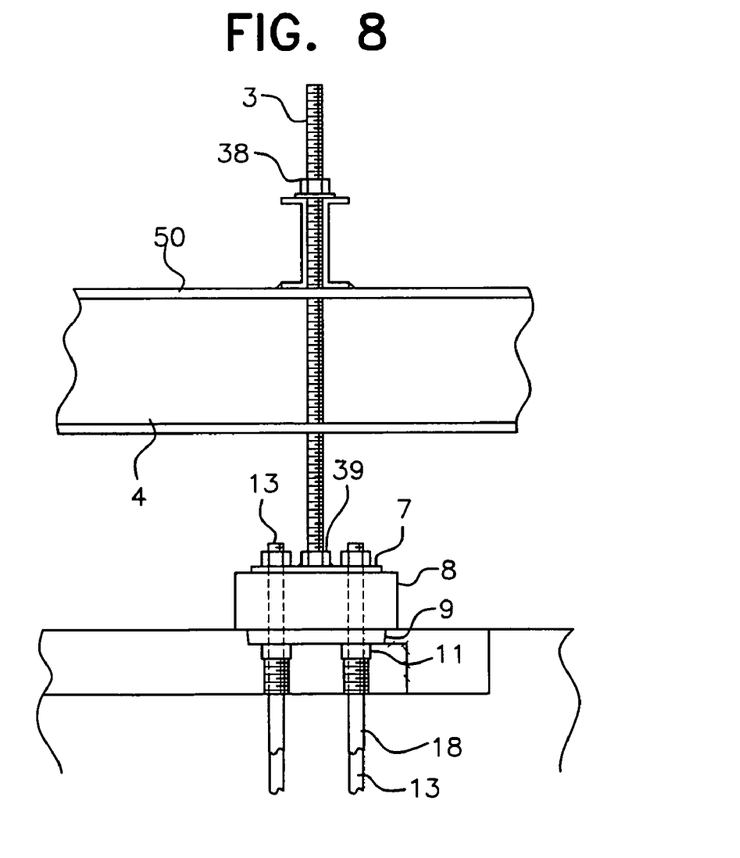
FIG. 8 is an enlarged fragmental view illustrating the template assembly.

Referring to FIGS. 1 and 8, the template assembly is generally designated by reference numeral 37. The template assembly 37 is a temporary structure securing and positioning the anchor bolts 13 and Styrofoam blockouts 12 while forming a recessed tower grout trough 14 during pouring of the concrete for the foundation cap 46 and until the concrete initially sets.

The template assembly 37 consists of a generally square frame structure 50 comprising channels or I-beams 1 and 4 welded or bolted together. The frame structure 50 supports the top ring 7 and bottom ring 9 steel template rings unified and separated by several pieces of angle iron 8 which are welded between the steel template rings 7 and 9. The template rings 7 and 9 have bolt holes in exact vertical alignment to match with the bolt holes in the tower base flange 33. The steel template rings 7 and 9 are suspended below the frame structure 50 by all thread bolts 3 nutted atop the channels or I-beams 1 or 4 by nuts 38 and connected to the top template ring 7 by nuts 39 welded thereto. The nuts 38 can be turned to lengthen or shortened the spaced between the frame structure 50 and the top of the unified template rings 7 and 9 to allow the unified template rings to be leveled. The frame structure 50 is supported around the perimeter of the excavation 29 by any suitable support structure, such as wooden timbers 5 atop the surrounding ground. The wooden timbers 5 are stacked atop each other to the required height so the template assembly 37 is near level when placed atop the wooden timbers 5 by using a crane.

The blockouts 12 of "Styrofoam" or the like are duct taped underneath the bottom template ring 9 in at least three (3) positions to create voids in the concrete below the bottom of the grout trough 14. These voids allow placement of the tower leveling nuts 11 which support the tower underneath the tower base flange and above the bottom of the grout trough 14. The tower leveling nuts 11 are adjusted by turning in order to plumb the tower to a true vertical position prior to grouting the tower base flange 33 in position. The voids below the grout trough 14 created by the blackouts 12 also provide a space for lowering the leveling nuts 11 after the tower base flange 33 has been grouted into position and the grout has hardened sufficiently to support the tower. Lowering the leveling nuts into their respective blockout void provides a space between the top of the leveling nuts 11 turned down into the blockout void and the underneath side of the base flange 33. This space allows those anchor bolts 13 with the leveling nuts 11 to be elongated by post-tensioning in the same manner as all other anchor bolts 13.

Construction Sequence and Special Features

1. Drive pile anchor CMPs 23 with mandrel pile driver (not shown). The CMPs 23 will initially extend above the ground surface.

2. The pile anchor bolts or tendons 16 with PVC sleeves 18 and centralizers 32 are placed inside the CMPs 23.

3. The pile anchor bolts or tendons 16 are grouted in place by pumping grout or concrete 24 into the pile anchor CMPs 23. The top of the grout 24 should be at least two (2) feet below the bottom of the concrete foundation cap to be constructed, leaving gap 31.

4. The grout 24 of pile anchors 47 is allowed to cure a minimum of twelve (12) hours before excavation (if required) for concrete foundation cap 46.

5. Excavate for concrete foundation cap 46. Hand work required around pile anchor CMPs 23.

6. Place outer CMP 29 in excavation.

7. Cut off pile anchor CMPs 23 at bottom of concrete foundation cap and fill the two (2) feet of each pile anchor CMP with foam or other equivalent compressive filler.

8. Place bolts 13 with thread nuts 43 through holes in segments in embedment ring 19 and thread nuts 44 under embedment ring; install lap joints connecting embedment ring segments.

9. Place reinforcing rebars 34 top and bottom, tie wire rebar to anchor bolts and circular hoops near ends and bend.

10. Pour concrete and finish concrete foundation cap 46.

11. Post-tension pile anchor bolts 16.

12. Pour sand/cement slurry in annular space 30 between the concrete foundation cap 46 and edge of foundation.

13. After seven (7) days, install tower atop concrete foundation cap 46 and post-tension tower anchor bolts 13.

The pile anchor foundation 52 of the present invention provides significant structural and operational advantages as follows:

1. The pile anchors 47 of the pile anchor foundation 52 are tension members only which pull the concrete foundation cap 46 downward compressing the underlying bearing soils with such a compression force that the concrete foundation cap is always bearing on the underlying soils even under the greatest overturning and uplift forces transferred to the concrete foundation cap from the tower structure by the tower anchor bolts 13 atop the foundation cap.

2. The pile anchor bolts or tendons 16 are sleeved to eliminate stress reversals and fatigue while the bolt is stretched by jacking or torquing (post-tensioning).

3. The post-tensioned pile anchor bolts 16 are shielded from bonding with the reinforced concrete of the concrete foundation cap 46 allowing the bolts or tendons 16 to elongate when pulled upward by jacks to the required post-tension. The post-tensioned bolts or tendons 16 are secured in tension by nuts 28 which are threaded atop the pile anchor base plates 17 against the top of the concrete foundation cap 46, thus pulling the cap 46 downward with great compression against the underlying soils. Pile anchor bolts or tendons 16 may be re-tensioned as necessary using thread nuts 28.

4. The pull down/hold down force of the pile anchors 47 results from the post-tensioning of the pile anchor bolts 16 against the pile anchor base plates 17 atop the concrete foundation cap 46. Each pile anchor 47 is pulled upwardly toward the bottom of the concrete foundation cap 46 until the resisting skin friction along the sides of the CMP 23 equals the post-tension of the tension bolt 16 centered in the CMP and restrained by the grout 24. The post-tension downward force atop the concrete foundation cap 46 by each pile anchor 47 should exceed the determined maximum uplift of the pile anchor by a factor of 1.5 or greater.

5. The pile anchors 47 include compressible voids or foam filled spaces 31 between the bottom of the concrete foundation cap 46 and the top of the grout filled pile. The compressible space 31 allows the concrete cap foundation 46 to be pulled downward compressing and consolidating the underlying soils to the required bearing strengths and allowing the pile anchors 47 to pull upward developing the skin friction resistance equal to the pile anchor bolt or tendon post-tension.

6. The pile anchors 47 preferably have corrugated metal pipes 23 around their perimeter to maximize the skin friction resistance with the contacting exterior soils.

7. The pile anchor bolts or tendons 16 are preferably fitted with centralizers 32 to maintain their position in the center of the corrugated metal pipe 23.

8. The pile anchors 47 are filled with cementitious grout or concrete to bond and secure all-thread bolts or tendons 16 as a structural unit with the perimeter corrugated metal pipe 23.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A method of forming a pile anchor foundation for supporting a heavy load from a ground surface comprising the steps of:
   inserting pile anchor pipes into a ground surface;
   placing pile anchor bolts having sleeves thereon longitudinally in said pipes with the pile anchor bolts extending above an upper end of said pipes;
   filling the pipes with cementitious material and allowing said cementitious material to cure to form pile anchors;
   placing load anchor bolts generally parallel to said pile anchor bolts;
   pouring a concrete cap foundation above the upper ends of said pile anchor pipes and in contact with the upper ends of said sleeved pile anchor bolts and said load anchor bolts while leaving an unfilled space between a bottom surface of the cap foundation and an upper end of said pile anchors and allowing said cap foundation to cure;
   post tensioning said pile anchor bolts; and
   placing a support flange of a heavy load onto the upper ends of said load anchor bolts and post tensioning said load anchor bolts with said support flange attached thereto.

2. The method as claimed in claim 1 wherein the step of pouring the concrete cap foundation includes the steps of:
   forming a grout trough in a top surface of said concrete cap foundation with said load anchor bolts extending through said trough;
   supporting said support flange on said load anchor bolts above a bottom of said grout trough;
   placing grout in said trough below said support flange;
   lowering said support flange into engagement with said grout in said trough after said grout cures; and
   post tensioning said load anchor bolts by nuts threaded thereon and engaging an upper surface of said support flange.

3. The method as claimed in claim 1 wherein a depth of said unfilled space is at least about two feet.

4. The method as claimed in claim 1 wherein the step of pouring said cap foundation includes the step of placing crushable or compressive material in said space between said cap foundation bottom surface and the upper end of the pile anchors to enable downward movement of said cap foundation after curing by tensioning the pile anchor bolts and moving said cap foundation downwardly, thereby compressing underlying soils.

5. The method as claimed in claim 4 wherein the step of placing crushable or compressive material includes placing Styrofoam blockouts in said space.

6. The method as claimed in claim 1 wherein said step of placing said pile anchor bolts in said pile anchor pipes includes fitting said pile anchor bolts with centralizers to maintain their position in a center of said pipes.

7. A method of forming a pile anchor foundation for supporting a heavy load from a ground surface comprising the steps of:
   forming a plurality of generally vertical pile anchors in a ground surface each of which includes placing a pile anchor bolt having a sleeve thereon longitudinally therein with the pile anchor bolts extending above an upper end of the pile anchor;
   placing load anchor bolts generally parallel to said pile anchor bolts;
   forming a cap foundation above said upper ends of said pile anchors and in contact with upper ends of said sleeved pile anchor bolts and said load anchor bolts while leaving a space between said pile anchor upper ends and a bottom surface of said cap foundation, with said pile anchor bolts extending through said space;
   post tensioning said pile anchor bolts; and
   placing a support flange of a heavy load onto the upper ends of said load anchor bolts and post tensioning said load anchor bolts with said support flange attached thereto.

8. The method as claimed in claim 7 wherein the step of forming said cap foundation includes the step of placing crushable material in said space between the bottom surface of said cap foundation and the upper ends of the pile anchors to enable downward movement of said cap foundation by tensioning the pile anchor bolts and moving said cap foundation downwardly, thereby compressing underlying soils.

9. The method as claimed in claim 7 wherein the step of forming said cap foundation includes leaving an unfilled space having a depth of at least about two feet between the bottom surface of the cap foundation and said pile anchor upper ends.

10. The method as claimed in claim 9 wherein the step of forming said cap foundation includes the step of placing crushable material in said space between said cap foundation bottom surface and said pile anchor upper ends to enable downward movement of said cap foundation by tensioning the pile anchor bolts and moving said cap foundation downwardly, thereby compressing underlying soils.

11. The method as claimed in claim 10 wherein the step of placing crushable material includes placing Styrofoam blockouts in said space.

12. The method as claimed in claim 7 wherein the step of forming the concrete cap foundation includes the steps of:
   forming a grout trough in a top surface of said cap foundation with said load anchor bolts extending through said trough;
   supporting said support flange on said load anchor bolts above a bottom of said grout trough;
   placing grout in said trough below said support flange;
   lowering said support flange into engagement with said grout in said trough after said grout cures; and
   post tensioning said load anchor bolts by nuts threaded thereon and engaging an upper surface of said support flange.

13. The method as claimed in claim 7 wherein said step of placing said pile anchor bolts includes fitting said pile anchor bolts with centralizers to maintain their position in a center of said pile anchors.

14. A method of forming a pile anchor foundation for supporting a load from a ground surface comprising the steps of:
   forming a plurality of generally vertical pile anchors in a ground surface each of which includes placing a pile anchor bolt having a sleeve thereon longitudinally in said ground surface and filling each pile anchor with cementitious material to an upper end thereof, said pile anchor bolts extending above said pile anchor upper ends;
   leaving an unfilled space above each of said pile anchor upper ends, said pile anchor bolts extending through said space;
   placing crushable material in said space;

forming a cap foundation above said pile anchor upper ends and above said crushable material by pouring cementitious material, said cap foundation being in contact with upper ends of said sleeved pile anchor bolts which extend through said space, through said crushable material and through said cap foundation; and post tensioning said pile anchor bolts, said crushable material in said space enabling downward movement of said cap foundation and compression of underlying soils upon said tensioning of the pile anchor bolts.

15. The method as claimed in claim 14 wherein the step of forming the concrete cap foundation includes the steps of:

placing load anchor bolts generally parallel to said pile anchor bolts before pouring the cementitious material of said cap;

pouring said cap cementitious material around said load anchor bolts, upper ends of said load anchor bolts extending above said foundation cap;

placing a support flange of a heavy load onto the upper ends of said load anchor bolts and post tensioning said load anchor bolts with said support flange attached thereto.

16. The method as claimed in claim 15 wherein the step of forming the concrete cap foundation further includes the steps of:

forming a grout trough in a top surface of said cap foundation with upper ends of said load anchor bolts extending through said trough;

supporting said support flange on said load anchor bolts above a bottom of said grout trough;

placing grout in said trough below said support flange;

lowering said support flange into engagement with said grout in said trough after said grout cures; and post tensioning said load anchor bolts by nuts threaded thereon and engaging an upper surface of said support flange.

* * * * *